Nov. 19, 1940.  H. NERWIN  2,222,298
ADJUSTABLE DIAPHRAGM
Filed Sept. 27, 1939
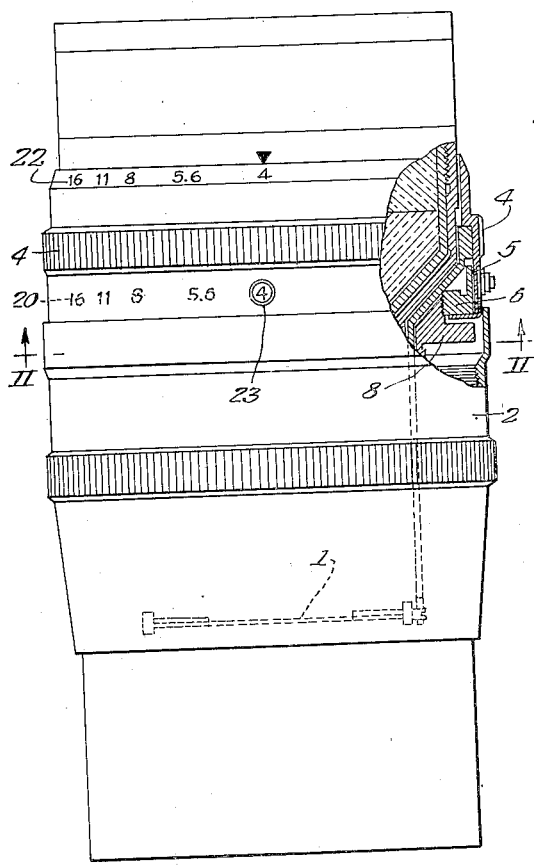
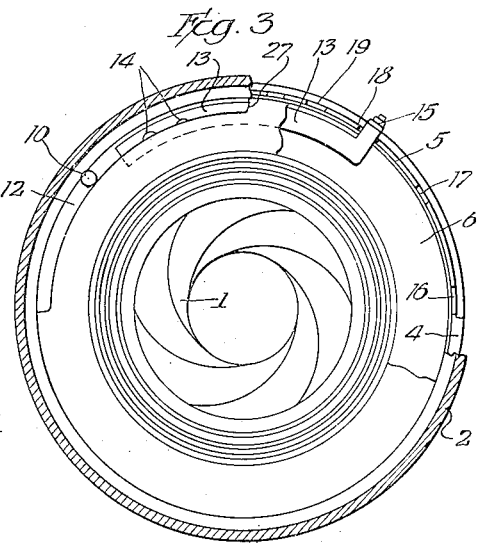
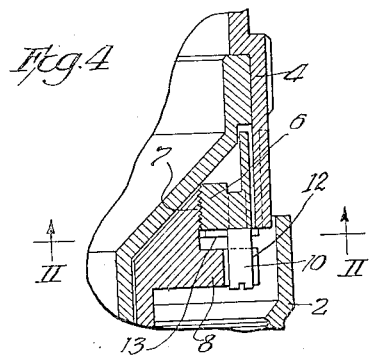
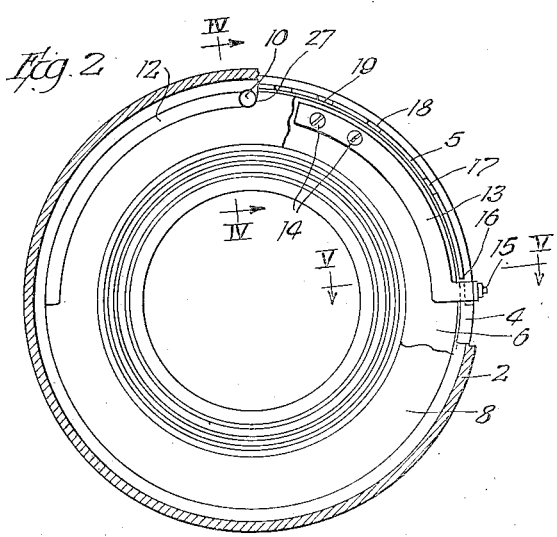
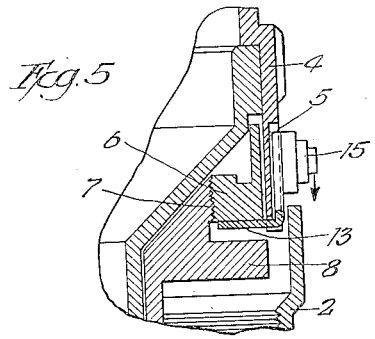
Inventor:
Hubert Nerwin Patented Nov. 19, 1940

2,222,298

UNITED STATES PATENT OFFICE 2,222,298

ADJUSTABLE DIAPHRAGM

Hubert Nerwin, Dresden, Germany, assignor to Zeiss Ikon Aktiengesellschaft, Dresden, Germany Application September 27, 1939, Serial No. 296,803
In Germany November 18, 1938

3 Claims. (Cl. 95—64)

The invention relates to improvements in adjustable diaphragms for photographic objectives and particularly is directed to diaphragms used in photographic objectives of mirror reflex camera or cameras provided with a mirror reflex finder attachment.

In mirror reflex cameras the photographic objective is also used almost without exception for focusing the scene to be photographed upon a translucent screen or a ground glass plate. It is advisable to employ during this focusing operation the largest available aperture of the diaphragm, in order to obtain an image as bright as possible, even though it may be necessary to photograph the picture on the photographic film or plate with a smaller diaphragm aperture. In the latter case it is, of course, required that after focusing the diaphragm aperture be reduced to the desired or necessary size.

Such a manipulation of the diaphragm, first employing the largest aperture during focusing and then employing a smaller aperture during the exposure of the film, has several disadvantages. When adjusting the diaphragm to the smaller aperture, the camera has to be taken out of its operative position in order that the diaphragm scale on the objective can be viewed during the adjustment. This is not only inconvenient, but requires much time, with the result that the versatility of the camera is impaired.

It is the object of the present invention to overcome this drawback and inconvenience in the operation of the customary diaphragm constructions by providing the objective mount with a device which permits a full opening of the adjustable diaphragm and a quick adjustment of the diaphragm aperture to a previously selected smaller aperture, without taking the camera out of its operative position and without looking at the diaphragm aperture scale.

Another object of the invention is the mounting of a ring within the objective mount containing the adjustable diaphragm, which ring may be locked to the customary diaphragm adjusting member in a number of predetermined positions in which the ring prevents the adjustment of the diaphragm to an aperture smaller than the one represented by the locked position, but permits an adjustment of the diaphragm to its largest aperture.

It is also an object of the invention to provide the diaphragm of the invention with means indicating the particular aperture to which the selectively lockable ring will limit the adjustment of the diaphragm when the diaphragm adjusting member is moved toward diaphragm closing position.

Other objects of the invention will be apparent or will be specifically pointed out in the description forming a part of this specification, but the invention is not limited to the embodiment of the invention herein described, as various forms may be adopted within the scope of the claims.

Referring to the figures which illustrate by way of example one embodiment of the invention:

Fig. 1 is an elevation view, partly in section of a photographic objective mount provided with the novel adjustable diaphragm of the present invention.

Fig. 2 is a cross-sectional view, with parts broken away, substantially along the line II—II of Figs. 1 and 4.

Fig. 3 is a cross-sectional view similar to Fig. 2, however, with the locking ring in another position, and Figs. 4 and 5 are sectional views substantially along the lines IV—IV and V—V respectively of Fig. 2.

The adjustable diaphragm 1 is arranged in the mount 2 of the photographic objective and the customary manually operable diaphragm adjusting ring 4 is provided at the lower edge of its knurled circumference with an axial flange 5 loosely surrounding a second ring 6 which is rotatably mounted at 7 on a stationary part 8 forming a portion of the objective mount 2. The ring 6 has a pin 10 fixedly attached thereto and projecting into circumferential recess 12 in the stationary part 8, whereby the rotative movement of the ring 6 relatively to the part 8 is limited.

An arc-shaped strip 13 of spring metal is secured with one end to the lower face of the ring 6, as is illustrated at 14 in Figs. 2 and 3. The other end of the strip 13 extends radially outwardly and is bent at a right angle so as to overlap the outer circumference of the axial flange 5 of the diaphragm adjusting ring 4 as shown in Figs. 1 and 5. The outer end of the strip 13 has an operating button 15 attached thereto. The lower edge of the flange 5 is provided with a series of notches 16, 17, 18 and 19, each of which representing one diaphragm aperture and each of which being adapted to receive selectively the outwardly extended portion of the resilient strip 13. When the button 15 is depressed in the direction of the arrow in Fig. 5 the resilient strip 13 is released from the notch of the flange 5 and now a relative rotation between the diaphragm adjusting ring 4 and the locking ring 6 is possible and the strip 13 may be moved in engagement with any other one of the notches 16 to 19.

The outer circumference of the locking ring 6 is provided with a diaphragm aperture scale 20 corresponding to the customary diaphragm scale 22 on the diaphragm adjusting ring 4. The flange 5 of the diaphragm adjusting ring 4 is provided with a window opening 23 in which appears one numeral of the scale 20 one at a time to indicate to what smallest aperture the diaphragm 1 may be adjusted when the diaphragm adjusting ring 4 is rotated in diaphragm closing direction, which in Figs. 2 and 3 is in clockwise direction.

In the drawing (Figs. 1 and 2) the diaphragm aperture has been adjusted to its largest aperture 1:4. The resilient strip 13 engages the notch 16 and the pin 10 engages the shoulder 27 formed by one end of the arcuate recess 12 in the member 8. It is apparent that the diaphragm adjusting ring 4 cannot be adjusted unless the locking ring 6 is unlatched from the diaphragm adjusting ring 4, 5 by actuating the button 15 to bring the resilient strip 13 out of engagement with the notch 16. In this position of the diaphragm the aperture 1:4 is used for focusing and exposing the film.

If it is desired to expose the film with a smaller aperture, for instance 1:8, then the button 15 is actuated to move the resilient strip 13 out of the notch 16 and then the diaphragm adjusting ring 4, 5 is rotated relatively to the ring 6 until the numeral "8" appears in the window 23. The button 15 is now released, thus locking the ring 6 again to the diaphragm adjusting ring 4, 5 but at this time the strip 13 engages the notch 18 (Fig. 4). It is now possible to rotate the diaphragm ring 4, 5 between the apertures 1:8 and 1:4. When focusing it wil be of advantage to employ the larger aperture 1:4, which can be readily adjusted by rotating the ring 4, 5 anticlockwise until a stop is felt, namely, when the diaphragm is fully open. Before making the exposure the diaphragm adjusting ring 4, 5 is again rotated clockwise until another stop is felt, namely when the pin 10 engages the shoulder 27. A glance at the window 23 will indicate that the diaphragm has been adjusted to the previously selected aperture 1:8.

What I claim is:

1. In an adjustable diaphragm for photographic objectives, a manually rotatable diaphragm adjusting ring provided at one end with a series of circumferentially spaced notches, a second ring within said diaphragm adjusting ring and independently rotatable with respect to the latter, a manually controlled leaf spring attached to said second ring for selectively engaging any one of said series of notches in said diaphragm adjusting ring, each of said notches representing a different predetermined diaphragm aperture, a projection on said second ring, a stationary member on which said rotatable ring is rotatably mounted, said stationary member being provided with stop means for engaging said projection on said second ring when the diaphragm adjusting ring is rotated in a direction in which the aperture of the diaphragm is reduced, whereby the reduction in the size of the diaphragm aperture is limited to the size represented by the selected position in which said second ring is locked to said diaphragm adjusting ring, and means for indicating the diaphragm aperture to which the diaphragm is adjustable when said stop projection on said second ring engages said stop means on said stationary member, said indicating means comprising a diaphragm aperture scale on the outer circumference of said second ring and a window in that portion of the diaphragm adjusting ring covering the outer circumference of said second ring.

2. In an adjustable diaphragm for photographic objectives, a manually rotatable diaphragm adjusting ring, a second ring within said diaphragm adjusting ring and independently rotatable with respect to the latter, manually controled means for locking said second ring selectively in a series of positions to said diaphragm adjusting ring, said manually controlled means including a resilient strip attached with one end to said second ring and resiliently engaging said diaphragm adjusting ring with its other end, said last named end of the strip being adapted to engage selectively any one of a series of notches provided in said diaphragm adjusting ring, each of said notches representing a different predetermined diaphragm aperture, a projection on said second ring, and a stationary member on which said second ring is rotatably mounted, said stationary member being provided with stop means for engaging said projection on said second ring when the diaphragm adjusting ring is rotated in a direction in which the aperture of the diaphragm is reduced, whereby the reduction in the size of the diaphragm aperture is limited to the size represented by the selected position in which said second ring is locked to said diaphragm adjusting ring.

3. In an adjustable diaphragm for photographic objectives, a manually rotatable diaphragm adjusting ring, a second ring within said diaphragm adjusting ring and independently rotatable with respect to the latter, manually controlled means for locking said second ring selectively in a series of positions to said diaphragm adjusting ring, said manually controlled means including a resilient strip attached with one end to said second ring and resiliently engaging said diaphragm adjusting ring with its other end, said last named end of the strip being adapted to engage selectively any one of a series of notches provided in said diaphragm adjusting ring, and a manually operable knob on said last named end of said resilient strip for disengaging said strip from any one of said notches, each of said notches representing a different predetermined diaphragm aperture, a projection on said second ring, and a stationary member on which said second ring is rotatably mounted, said stationary member being provided with stop means for engaging said projection on said second ring when the diaphragm adjusting ring is rotated in a direction in which the aperture of the diaphragm is reduced, whereby the reduction in the size of the diaphragm aperture is limited to the size represented by the selected position in which said second ring is locked to said diaphragm adjusting ring.

HUBERT NERWIN.